G. FOSTER.
HAME FASTENER.
APPLICATION FILED MAR. 29, 1909.

999,639.

Patented Aug. 1, 1911.

Witnesses
F. L. Ourand
M. K. Freeman

Inventor
George Foster
By Louis Bagger
his Attorneys

COLUMBIA PLANOGRAPH CO., WASHINGTON, D. C.

UNITED STATES PATENT OFFICE.

GEORGE FOSTER, OF SWITZ CITY, INDIANA.

HAME-FASTENER.

999,639. Specification of Letters Patent. Patented Aug. 1, 1911.

Application filed March 29, 1909. Serial No. 486,545.

*To all whom it may concern:*

Be it known that I, GEORGE FOSTER, a citizen of the United States, residing at Switz City, in the county of Greene and State of Indiana, have invented certain new and useful Improvements in Hame-Fasteners, of which the following is a specification.

My invention relates to an improvement in hame fasteners, and the object is to provide means whereby the hook members can be readily connected together or disconnected from each other.

The invention consists of certain novel features of construction and combinations of parts which will be hereinafter fully described and pointed out in the claims.

Figure 1:
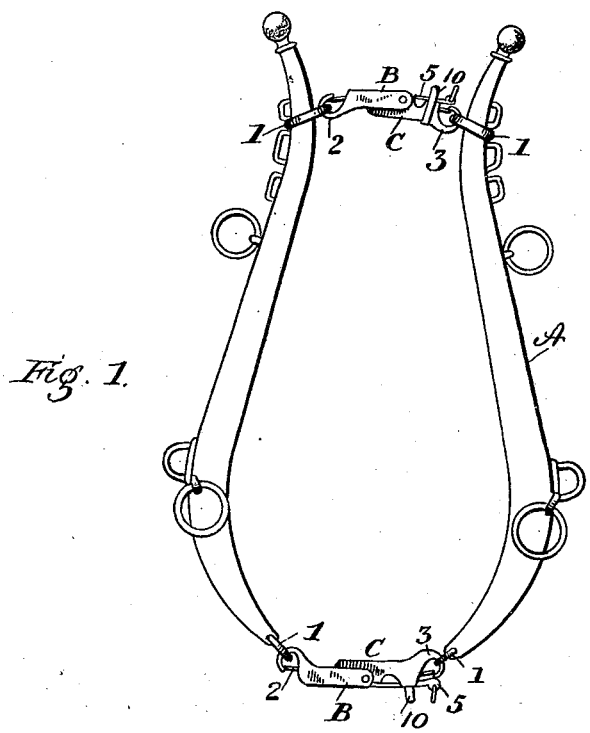
Figure 2:
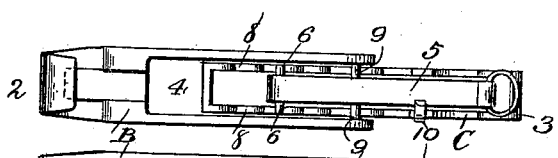
Figure 3:
Figure 4:
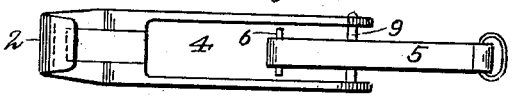
Figure 5:

In the accompanying drawings—Figure 1 is a view showing my invention connected to the ends of a pair of hames; Fig. 2 is a top plan view of the hook members connected together; Fig. 3 is a bottom plan view, and Figs. 4 and 5 are views of each member.

A represents the hames, which are provided with the usual rings 1 and B and C are the hook members which are provided with snap hooks 2 and 3, which are adapted to engage the rings of the hames.

The member B has the body thereof bifurcated as at 4. The lever 5 is pivotally mounted in the bifurcated ends of the member B, and lugs or projections 6 are formed on one end of the lever.

The member C is made hollow through its body portion as at 7, and ratchet teeth 8 are formed on the body in which are received the projections 6 of the lever 5. The member C is of less width than the member B and is capable of being received in the body B, and the projections 6, 6, are adapted to enter the ratchet teeth 8 of the member C, and the shaft 9 to which the lever 5 is pivotally connected in the member B is adapted to enter the ratchet teeth. The outer end of the lever is held between the sides of the member C by a spring clasp 10 which is connected to the member C, and it projects over the lever 5 when the lever has been pressed down upon the member C.

When the parts are connected in this manner the hames are connected together, but when it is desired to release the hames the lever is disengaged from the clasp 10, and by drawing the lever down it will become disengaged from the ratchet teeth thereby disconnecting the two members B and C.

By this method it is unnecessary to disconnect the members B and C from the hames, but by simply releasing the lever from the member C the two members can be disconnected. However, when it is desired to clasp the hames upon a collar the member C is received within the member B and the lever 5 will engage the ratchet teeth at one end of the lever, the other end of the lever being held by the clasp 10 on the member C.

From the foregoing it will be seen that I have provided a very simple invention which can be manufactured at small cost and which forms a simple method of connecting the hames together.

It is evident that more or less slight changes might be made in the form and arrangement of the several parts described without departing from the spirit and scope of my invention, and hence I do not wish to be limited to the exact construction herein set forth, but:

Having fully described my invention, what I claim as new and desire to secure by Letters Patent is:

1. A hame fastener comprising a bifurcated and a slotted member, each having a snap hook at its outer end, a lever carrying a shaft which is journaled in the bifurcated member, said lever carrying outwardly extending projections at one end, the slotted member provided with ratchet-teeth which initially receive the projections on the lever and subsequently the shaft at points between the lever and the ends of the bifurcated member, and means for locking the lever to hold the parts together.

2. A hame fastener comprising a bifurcated and a slotted member, a shaft journaled in the bifurcated member, a lever journaled on the shaft, a slotted member having ratchet-teeth formed on the sides thereof, said slotted member adapted to be received in the divided end of the bifurcated member, projections on one end of the lever adapted to be received by the ratchet-teeth, and means on the slotted member for locking the lever between the sides thereof.

In testimony whereof I affix my signature, in the presence of two witnesses.

GEORGE FOSTER.

Witnesses:
HENRY SWITZ,
FAY O'DONALD.

Copies of this patent may be obtained for five cents each, by addressing the "Commissioner of Patents, Washington, D. C."